United States Patent [19]

Minner et al.

[11] Patent Number: 5,364,069
[45] Date of Patent: Nov. 15, 1994

[54] DRAINCOCK ASSEMBLY FOR VEHICLE RADIATOR

[75] Inventors: Jeffrey L. Minner, Lockport; Frank J. Farkas, Gentzville, both of N.Y.

[73] Assignee: General Motors Corporation, Detroit, Mich.

[21] Appl. No.: 140,939

[22] Filed: Oct. 25, 1993

[51] Int. Cl.$^5$ ............................................. F16K 51/00
[52] U.S. Cl. .................... 251/144; 251/900; 251/252; 137/801
[58] Field of Search ............... 251/904, 900, 252, 144; 137/601, 801

[56] References Cited

U.S. PATENT DOCUMENTS

| | | | |
|---|---|---|---|
| 3,231,236 | 1/1966 | Hodel et al. | 251/324 |
| 4,134,573 | 1/1979 | Messinger | 251/900 |
| 4,679,618 | 7/1987 | Farkas | 165/71 |
| 5,246,202 | 9/1993 | Beamer | 251/252 |

FOREIGN PATENT DOCUMENTS 2701194  3/1978  Germany ............... 251/252

*Primary Examiner*—A. Michael Chambers
*Attorney, Agent, or Firm*—Patrick M. Griffin

[57] ABSTRACT

A draincock assembly for a radiator tank of the type that has a drain tube opening into a cylindrical valve body surface across a sharp aperture, with an O-ring seal on a movable valve member that is pulled back and forth across the aperture as the valve opens and closes. A guiding web is molded across the center of the aperture, running in the axial direction. As the O-ring moves, it's otherwise unsupported section is supported and guided by the web. The O-ring is prevented from bulging out and being cut by the edge of the aperture.

3 Claims, 1 Drawing Sheet

DRAINCOCK ASSEMBLY FOR VEHICLE RADIATOR

This invention relates to vehicle heat exchangers in general, and specifically to an improved draincock assembly for a vehicle radiator tank.

BACKGROUND OF THE INVENTION

Vehicle radiators have a pair of coolant tanks located to either side of a tube and fin core, each of which is substantially filled by liquid coolant. Most often, the tanks are oriented vertically, with the core tubes running horizontally between. It is occasionally necessary to drain the coolant, and the lower end of a tank is the most convenient location for a draincock assembly to do so. The usual draincock assembly includes a tubular valve body protruding generally horizontally from the tank with an open outer end. A drain tube protrudes from the valve body approximately perpendicularly thereto, opening through the inner surface of the valve body. A valve is inserted through the open outer end of the valve body, and is movably supported the valve body so as to translate back and forth, when twisted by an operator, between a closed position blocking the drain tube and an open position. In the closed position, a rubber O-ring carried on the valve is radially compressed into the inner surface of the valve body, blocking flow to the drain tube. When open, the O-ring is pulled back past the drain tube, and coolant can run through the valve body and into the drain tube and out.

To assure that coolant drains only through the drain tube and does not also leak out of the valve body, some means must also be provided to block the outer end of the valve body when the valve is open. In many cases, the valve is threaded into the valve body and the threads themselves block back flow sufficiently. Consequently, the inner surface of the valve body can be enlarged in diameter outboard of the drain tube opening, so that the O-ring is taken out of compression when the valve opens. However, a new valve design translates the valve body not with threads, but with a pin and cam slot. An allowed coassigned patent application Ser. No. 07/901,298 now U.S. Pat. No. 5,246,202 in the name of Henry Beamer covers this particular valve design. While this is a less expensive design to produce, and provides some other advantages over a threaded valve body, it does nothing inherently to prevent leakage out of the end of the valve body when the valve is open. Therefore, it is necessary that the O-ring be kept constantly in compression, both in the open and closed position. One consequence of this is that the compressed O-ring, as it is pulled past the edge of the aperture, can bulge out into the drain tube slightly and be damaged or cut.

SUMMARY OF THE INVENTION

The invention provides an improved draincock assembly of the type described above in which the valve O-ring is protected against damage. In the embodiment disclosed, the cylindrical inner surface of the valve body is interrupted by a generally oval shaped drain tube aperture that covers about a quarter of the circumference of the valve body. Because of the method by which the tank, valve body and drain tube are integrally molded, the edge of the aperture is quite sharp. To protect the O-ring as it travels, a guiding web is molded across the aperture, parallel to the axis of the valve body, with an inner surface that lies basically on the same surface as the inner surface of the valve body. Now, as the O-ring is pulled past the aperture, the web supports and guides the center portion of the otherwise unsupported section of O-ring, preventing it from bulging out or being damaged. The operation of the valve per se is otherwise unaffected. The web bisects the aperture, but does not cover enough area to seriously affect the drainage capacity out of the drain tube.

DESCRIPTION OF THE PREFERRED EMBODIMENT

These and other features and advantages of the invention will appear from the following written description, and from the drawings, in which.

Figure 1:
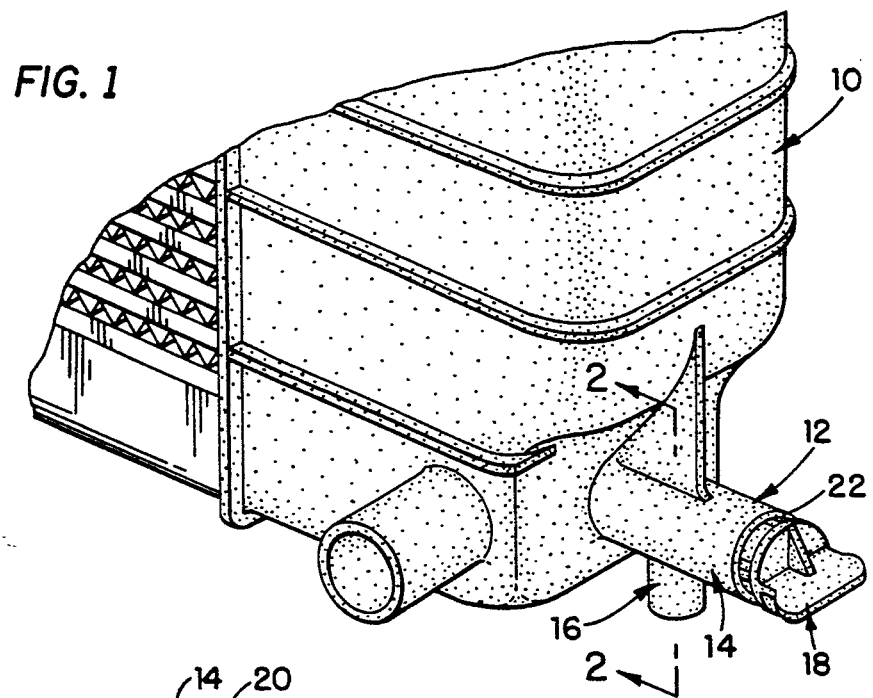
FIG. 1 is a perspective view of the lower end of one tank of a radiator incorporating the invention.

Referring first to FIG. 1, the lower end of a plastic radiator tank (10) incorporates a preferred embodiment of the draincock assembly of the invention, indicated generally at (12). Tank (10) is a one-piece plastic molding, and would be mounted to a vehicle body in a vertical orientation. Several of the components of draincock assembly (12) are integrally molded to tank (10), including a hollow cylindrical valve body (14) and drain tube (16). Valve body (14) protrudes horizontally from the side of the lower end of tank (10), while drain tube (16) protrudes from valve body (14) perpendicular thereto, and vertically downwardly, in the embodiment disclosed. Drain tube (16) could also protrude to the side, horizontally, if packaging constraints required it. A valve (18) is adapted to translate axially back and forth within valve body (14) as it is twisted by an operator to alternately cover and expose drain tube (16).

Figure 3:
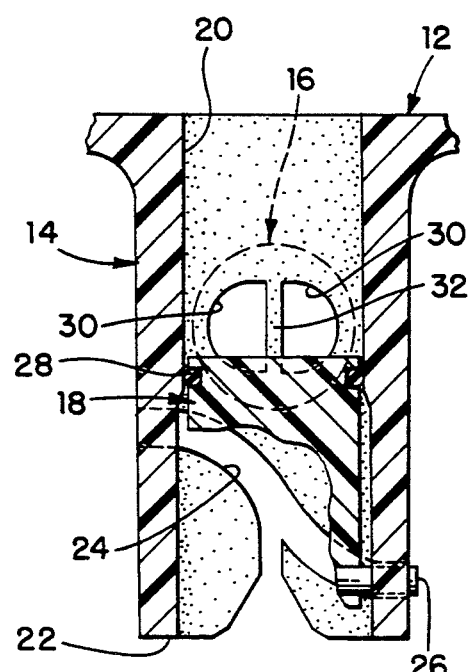
FIG. 3 is a cross section taken along the line 3—3 of FIG. 2, with part of the valve broken away.

Referring next to FIG. 3, valve body (14) and has a cylindrical inner surface (20) and an open outer end (22) remote from tank (10). Approximately half of the length of valve body (14) is cut through by a spiral shaped cam slot (24) into which a pin (26) is fitted. Twisting valve (18) moves pin (26) through slot (24) to shift valve (18) back and forth, as is detailed in the patent application referred to above. The details of the translation mechanism are not significant to the invention here per se. What is significant is the fact that that portion of valve body (14) outboard of drain tube (16), specifically the open end (22) and cam slot (24), clearly would leak coolant if it were allowed to reach that far. To prevent that, an O-ring (28) carried near the end of valve (18) is in radial compression against valve body cylindrical surface (20) continuously, that is, on both sides of drain tube (16). The rest of valve (18) has a radial clearance from surface (20), which even increases in diameter outboard of drain tube (16) so as to ease the insertion of valve (18) into valve body (14). In FIG. 3, the open position of valve (18) is shown, with pin (26) shifted to one end of cam slot (24), and O-ring (28) outboard of drain tube (16), still in compression against surface (20). Coolant can drain out of tank (10) and tube (16), but cannot pass O-ring (28). In the closed position, pin (26) would be at the opposite end of slot (24), and O-ring (28) would be compressed against surface (20) inboard of tube (16), so coolant could not drain out.

Figure 2:
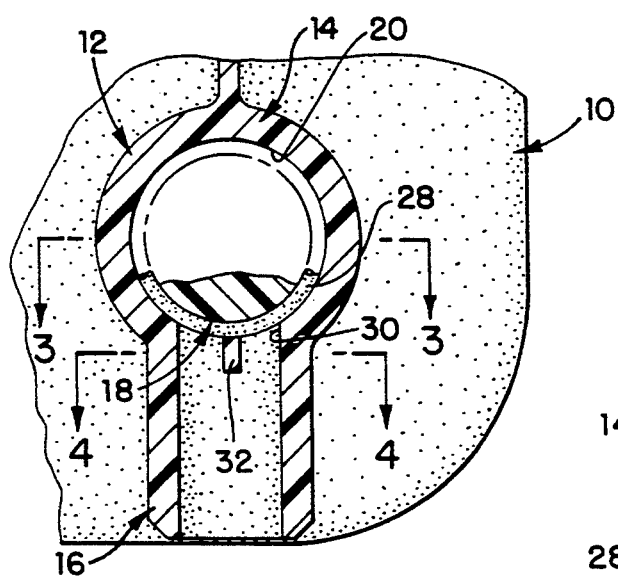
FIG. 2 is a cross section of the valve body taken along the line 2—2 of FIG. 1.
Figure 4:
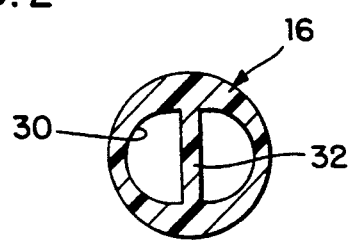
FIG. 4 is a cross section of the valve taken along the line 4—4 of FIG. 2.

Referring next to FIGS. 2 through 4, a potential problem with the kind of constant compression O-ring (28) described is evident. As noted, tank (10) is molded integrally of rigid plastic. Those skilled in the molding art will recognize that the valve body (14)/drain tube (16) combination has to be molded by two separate, movable inserts, not illustrated. One insert would move axially into valve body (14) to create it's cylindrical inner surface (20). Another would move axially up drain tube (16) to create it's inner surface. Other inserts would close together over the outside of both tube (16) and valve body (14) to create their outer surfaces and the cam slot (24), leaving the tell-Tale parting lines that are also not illustrated. The interface between these two inserts lies right on the cylindrical surface (20). Because the insert that creates the inner surface of drain tube (16) has to be pulled axially back out of it after molding, it inevitably leaves a sharp edged aperture (30) into and through cylindrical surface (20), which is oval shaped as disclosed. That is, the mold insert that creates the inner surface of drain tube (16) cannot have any part projecting radially beyond that surface, or it would bind and could not be withdrawn. Therefore, it is not possible to machine the kind of shoulder at the end of the insert that would create a chamfer at the edge of aperture (30). Consequently, it would be possible for O-ring (28) to bulge out into aperture (30) and be cut on it's sharp edge as it traveled past. The improvement of the invention prevents that possibility, described next.

Still referring to FIGS. 2 through 4, a guiding web (32) is molded across aperture (30), running parallel to the axis of valve body (14). Web (32) has the form of a rectangular beam bridging and bisecting aperture (30), and would be molded by a notch cut into the end of the insert that forms the inner surface of drain tube (16). The inner surface of web (32) would be formed by the same insert that forms cylindrical surface (20), and would be coextensive therewith. Now, as O-ring (28) is pulled or pushed across the edge of aperture (30), it is held in and guided by the inner surface of web (32), and is thereby prevented from bulging out into drain tube (16) sufficiently to be protected against damage. Web (32) does occupy some of the area of aperture (30), but not enough to affect it's drainage capacity. In fact, because of the presence of web (32), aperture (30) can be made wider than it otherwise could, with the oval shape shown, so drainage capacity is improved. What is fundamentally necessary is that web (32) divide aperture (30) into sufficiently small subwidths to prevent O-ring (28) from bulging out. What that subdivision will be in any particular case is best determined experimentally, and will vary with aperture width and degree of O-ring compression. An even wider aperture could be provided with more than one guiding web bridging it. Or, a multipart web, with two separate, but axially overlapping, surfaces could be provided, so long as the overlap was sufficient to guide and support O-ring (28) at all points. The bisecting web (32) shown is optimal, since it supports the center of the otherwise unsupported section of seal (28). Drain tube (16), most generally, could be no more than an aperture through valve body (14), though some kind of a protrusion from valve body (14) generally gives better drainage, in the nature of a downspout. Therefore, it will be understood that it is not intended to limit the invention to just the embodiment disclosed.

We Claim

1. In a draincock assembly for a tank of the type having a protruding valve body with a generally cylindrical inner surface and a sharp edged drain opening through said cylindrical surface, and in which an O-ring carried by a valve moves across said aperture as said movable draincock assembly opens and closes, the improvement comprising, a guiding web extending generally axially of said valve body and dividing said aperture, said web having an inner surface substantially coextensive with said valve body inner surface, whereby, as said compressed O-ring crosses said aperture, it is substantially prevented from bulging into said aperture.

2. A draincock assembly for a tank, comprising, a valve body having a generally cylindrical inner surface and protruding from said tank proximate a lower end thereof, said valve body having an outer end spaced axially from said tank, a drain tube protruding from said valve body between said tank and valve body outer end and opening through said valve body inner surface across an aperture, a valve movable axially within said valve body from a closed position covering said aperture to an open position exposing said aperture, a generally circular seal carried by said valve and continually compressed tightly against said valve body inner surface so as to prevent flow out of said tank when said valve is closed and to prevent flow out of said valve body outer end when said valve is open, and, at least one guiding web extending generally axially of said valve body and dividing said aperture, said web having an inner surface substantially coextensive with said valve body inner surface, whereby, as said compressed seal crosses said aperture, it is substantially prevented from bulging into said aperture.

3. A draincock assembly for a tank, comprising, a valve body having a generally cylindrical inner surface and protruding from said tank proximate a lower end thereof, said valve body having an outer end spaced axially from said tank, a drain tube protruding from said valve body between said tank and valve body outer end and opening through said valve body inner surface across an aperture, a valve movable axially within said valve body from a closed position covering said aperture to an open position exposing said aperture, a generally circular O-ring seal carried by said valve and continually compressed tightly against said valve body inner surface so as to prevent flow out of said tank when said valve is closed and to prevent flow out of said valve body outer end when said valve is open, and, a guiding web extending generally axially of said valve body and bifurcating said aperture, said web having an inner surface substantially coextensive with said valve body inner surface, whereby, as said compressed O-ring crosses said aperture, it is substantially prevented from bulging into said aperture.

* * * * *